No. 673,943. Patented May 14, 1901.
J. W. DALTON.
HAME FASTENER.
(Application filed June 14, 1900.)
(No Model.)
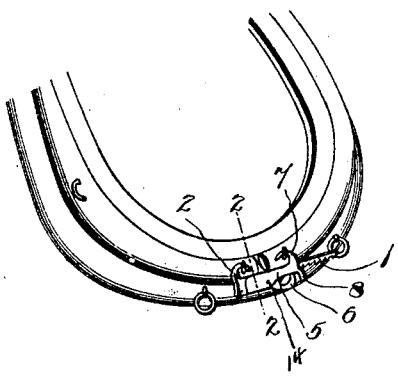
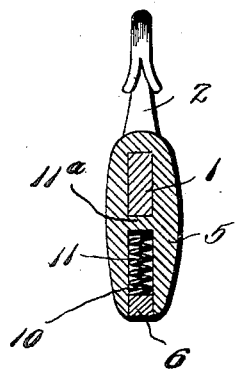
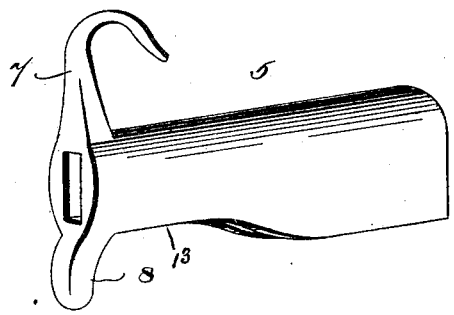
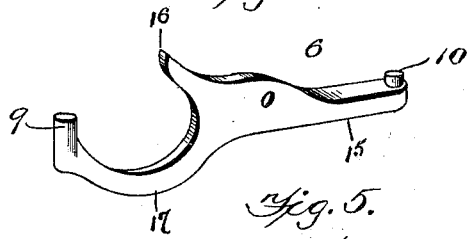
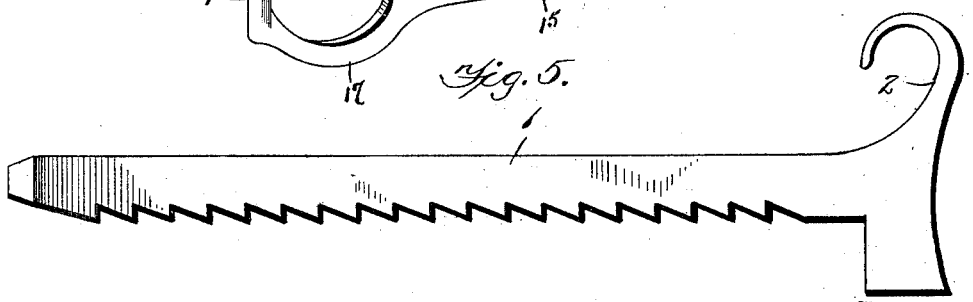
Witnesses
Inventor
John W. Dalton
Attorneys
THE NORRIS PETERS CO., PHOTO-LITHO., WASHINGTON, D. C.

UNITED STATES PATENT OFFICE.

JOHN W. DALTON, OF HILL CITY, TENNESSEE.

HAME-FASTENER.

SPECIFICATION forming part of Letters Patent No. 673,943, dated May 14, 1901.

Application filed June 14, 1900. Serial No. 20,338. (No model.)

*To all whom it may concern:*

Be it known that I, JOHN W. DALTON, a citizen of the United States, residing at Hill City, in the county of Hamilton and State of Tennessee, have invented certain new and useful Improvements in Hame-Fasteners; and I do declare the following to be a full, clear, and exact description of the invention, such as will enable others skilled in the art to which it appertains to make and use the same.

This invention has relation to hame-fasteners.

The object of the invention is to produce such a device which will be simple in construction, easy to manipulate, and not liable to get out of order, which can be manufactured at a small cost, and which will be exceedingly useful.

With these and other objects in view my invention consists in the construction and arrangement of the parts, as will be hereinafter more fully described and claimed, reference being had to the accompanying drawings, in which—

Figure 1 is a perspective view of the device complete, showing it in engagement with the lower ends of a set of hames. Fig. 2 is a vertical transverse section on the line 2 2 of Fig. 1. Fig. 3 is a perspective view of the dog and rack casing. Fig. 4 is a similar view of the dog and its connections. Fig. 5 is a side elevation of the rack.

In the drawings, 1 denotes the rack-bar, provided on one end thereof with a hook 2 for engaging the lower end of one member of a hame. 5 denotes a sliding casing adapted to have a sliding engagement with said rack-bar, the casing being cut away at one end, as shown, to form a recess. 6 denotes a dog pivoted to the lower side of said casing 5 and adapted to engage the said rack-bar to hold the parts in their adjusted positions, the dog being provided with a curved extension for a purpose presently to be explained. 7 denotes a hook formed upon the upper side of said casing 5, which is adapted to engage the other member of said hame. 8 denotes a finger-piece depending from one end of said casing 5, by which said casing may be adjusted. 9 denotes a vertical end piece formed on the end of the curved extension of said dog 6. The other end of said pawl is provided with an upwardly-projecting stud 10, which is encircled by a coil-spring 11, which is confined between said pawl and a partition 11ª of the casing 5.

From the foregoing description, taken in connection with the accompanying drawings, the construction of my device will be readily apparent, and a further description of the same is not deemed necessary.

I wish it to be understood that the casing, as hereinbefore stated, is provided at one end with a cut-away portion which forms a recess 13. The dog 6 is pivoted to the body of the casing at the intersection of the recess, as shown at 14. The partition-wall 11ª extends centrally through the body of the casing and does not in any way come in contact with the recess, as the same is open at its base to permit the dog and vertical end piece, the former to engage the rack-bar, the latter to be inclosed within the walls of the recess 13. The dog 6 consists of a body portion having an extended end 15, which is interposed between the main body portion of the casing and the partition-wall 11ª. The extended end of the dog is provided with an upwardly-extended stud 10, having mounted thereon one end of a coiled spring 11, the opposite end of said spring having its bearing against the partition-wall. The upper central portion of the dog is provided with a pawl 16 for engagement with the rack-bar 1 when the same is in engagement with the casing. The dog is further provided with an elongated curved portion 17, terminating in a vertical end 9. The dog, as hereinbefore stated, is pivoted to the body of the casing, and when the rack is in engagement with the pawl of the dog the vertical end 9 is snugly seated in walls of the recess, whereby to form a secure fastening. When it is desired to release the pawl from engagement with the rack-bar, the forefinger of either of the hands is inserted between the opening formed by the recess and the curve of the elongated end of the dog, and by pressing downward on the said curved elongated portion of the dog the pawl is readily released from the rack-bar.

Having thus described my invention, what I claim as new therein, and desire to secure by Letters Patent, is—

In a hame-fastener, the combination with a casing having an opening extending through the same, a central partition-wall therein, a cut-away portion at one end to form a recess, a hook and finger-piece arranged one above the other on said end, a rack-bar interposed between the partition-wall and upper inner wall of the casing, of a dog pivoted between the walls of the casing and having an extended end, a spring on said end to abut against the wall of the partition, a pawl on said dog for engagement with the rack-bar, an elongated curved portion on the opposite end of the dog having a vertical end piece, said end piece adapted to be inclosed within the walls of the recessed end when the pawl is in engagement with the rack-bar, and the recessed portion of said casing, and the elongated curved portion, serving to form an opening, whereby to release the pawl, from the rack-bar, substantially as specified.

In testimony whereof I have hereunto set my hand in presence of two subscribing witnesses.

JOHN W. DALTON.

Witnesses:
DORR BEME,
THOMAS F. BLACK.